US012603774B2

(12) United States Patent
Jaegerman et al.

(10) Patent No.: US 12,603,774 B2
(45) Date of Patent: Apr. 14, 2026

(54) MEMORY EFFICIENT HASH TABLE

(71) Applicant: Microsoft Technology Licensing, LLC, Redmond, WA (US)

(72) Inventors: Jonathan Jaegerman, Toronto (CA); Nathaniel Jesse Miller, Seattle, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 97 days.

(21) Appl. No.: 18/424,730

(22) Filed: Jan. 26, 2024

(65) Prior Publication Data

US 2025/0247225 A1     Jul. 31, 2025

(51) Int. Cl.
*H04L 9/14*          (2006.01)
*H04L 9/32*          (2006.01)

(52) U.S. Cl.
CPC .............. *H04L 9/14* (2013.01); *H04L 9/3242* (2013.01)

(58) Field of Classification Search
CPC ................................ H04L 9/14; H04L 9/3242
See application file for complete search history.

(56) References Cited

U.S. PATENT DOCUMENTS

| | | | | |
|---|---|---|---|---|
| 5,893,086 A | * | 4/1999 | Schmuck | ............ G06F 11/1435 |
| 7,788,240 B2 | * | 8/2010 | Rossmann | .......... G06F 16/9014 |
| | | | | 711/216 |
| 9,270,636 B2 | * | 2/2016 | Narasimhamurthy | ....................... |
| | | | | H04L 61/5046 |
| 10,515,064 B2 | * | 12/2019 | Bennett | ............... G06F 16/2228 |

| | | | | |
|---|---|---|---|---|
| 10,558,705 B2 | * | 2/2020 | Sengupta | ............ G06F 12/0864 |
| 11,036,799 B2 | * | 6/2021 | Sengupta | ............ G06F 12/0864 |
| 2006/0184759 A1 | * | 8/2006 | Jordan | ................ G06F 12/0261 |
| | | | | 711/170 |
| 2007/0282573 A1 | * | 12/2007 | Fritz | ..................... G06F 9/4498 |
| | | | | 703/2 |
| 2008/0052488 A1 | * | 2/2008 | Fritz | ................... G06F 12/0864 |
| | | | | 711/216 |
| 2008/0104403 A1 | * | 5/2008 | Gueron | ................. H04L 9/3247 |
| | | | | 713/181 |
| 2015/0370794 A1 | * | 12/2015 | Yochai | .................. G06F 16/137 |
| | | | | 707/747 |
| 2016/0014023 A1 | * | 1/2016 | He | .......................... H04L 45/54 |
| | | | | 370/408 |
| 2017/0154042 A1 | * | 6/2017 | Meyer | ................. G06F 16/2255 |

(Continued)

FOREIGN PATENT DOCUMENTS

| | | | | | |
|---|---|---|---|---|---|
| JP | | 2019121375 A | * | 7/2019 | ............. H04L 9/088 |

OTHER PUBLICATIONS

Wikipedia, "Hash Table", 2023, Retrieved from Wayback Machine (Year: 2023).*

(Continued)

*Primary Examiner* — John B King
(74) *Attorney, Agent, or Firm* — Barta Jones, PLLC

(57)          ABSTRACT

The disclosure reduces a memory footprint of a hash table that employs chaining as a collision avoidance solution. The methods and systems disclosed herein enable the use of chaining collision handling while reducing a memory footprint by storing parts of a tag and a link list pointer associated with a linked list that contain useful information, without storing parts of the tag and pointer that do not contain useful information. The linked list pointer and a hash key are packed together without reducing either size, and without using additional memory overhead.

20 Claims, 11 Drawing Sheets

(56) References Cited

U.S. PATENT DOCUMENTS

| | | | | |
|---|---|---|---|---|
| 2018/0011852 | A1* | 1/2018 | Bennett | G06F 16/2228 |
| 2019/0034427 | A1* | 1/2019 | Trika | G06F 16/21 |
| 2020/0175070 | A1* | 6/2020 | Sengupta | G06F 16/2255 |
| 2021/0326183 | A1* | 10/2021 | Leu | G06F 9/5066 |
| 2022/0395748 | A1* | 12/2022 | Salvi | A63F 13/355 |
| 2023/0315759 | A1* | 10/2023 | Maricic | G06F 16/282 |
| | | | | 707/791 |
| 2025/0279879 | A1* | 9/2025 | Pishdadian | H04L 9/0819 |

OTHER PUBLICATIONS

"birthday.ipynb," Retrieved from: https://colab.research.google.com/drive/1G_13j-NQHu4LRzJljEr_JTPEnrfwlWNh?usp=sharing, Retrieved Date: Jul. 13, 2023, 5 Pages.

Smerity.com, "How Google Sparsehash achieves two bits of overhead per entry using sparsetable," Retrieved from: https://smerity.com/articles/2015/google_sparsehash.html, May 25, 2015, 6 pages.

* cited by examiner

BUCKET 302          HASH TABLE 108          LINKED LISTS 306

| BUCKET 1 |
| BUCKET 2 |
| BUCKET 3 |
| BUCKET 4 |

| EMPTY |
| LEAF |
| BUCKET 3 |
| BUCKET 4 |
| BUCKET 5 |
| BUCKET 6 |

TAG: 64-Log(m)     LL Idx: Log(m)

VALUE

BUCKET m

BUCKET m

Max Memory Footprint

P99 PUT Time 1M Population

P99 GET Time 1M Population

P99 DELETE Time 1M Population

MEMORY EFFICIENT HASH TABLE

BACKGROUND

A hash table is a data structure that is used to store a key-value pair in an array comprising a plurality of buckets. A key may be a string identifying an entity (e.g., email identifier (ID) of a person) and the value is the data that denotes one or more objects associated with the entity (e.g., a name and a phone number of the person), called the value. A suitable hash function is used to convert the key (e.g., email ID of the person) into a hash of the key, which is usually, but not necessarily, a positive integer that functions as an index in the hash table. The index together with the value (e.g., a name such as User A and an associated phone number) are stored in buckets.

For various reasons (e.g., an imperfect hash function), it is possible that several different keys hash to the same index. This leads to hash collisions. Various techniques are currently used to address hash collisions. The two most common techniques are known as 'chaining' and 'open addressing.'

In chaining, the hash table contains a hash of the key (e.g., a hash of an email ID of a person). Different buckets contain the values of all entities that hash to the same index (e.g., the names and the associated phone numbers of all persons whose email IDs, used as a key, hash to the same index). For example, when the email IDs of User A and User B hash to the same index, there is one index for both of them, but the name User A, their associated phone number, and the name User B, and their associated phone number (i.e., values), are stored in two different buckets that are linked together (called a linked list). A linked list pointer from the index points to either value, but the linked list stores both the values in two different buckets linked together. Further, if another key hashes to the same index as the email IDs of User A and User B, a value of the other key is appended to the same linked list. Hence, a memory stores both the index and the linked list pointer, in addition to the values, which are stored in a separate array of linked lists. As such, while a retrieval of data might consume less compute time, chaining increases a memory footprint of the hash table.

In open addressing, the index and the value of the entity are stored in a single bucket. In one implementation, when the key of a new entity (e.g., User B) hashes to the same value as a previously stored entity (e.g., User A), a next empty bucket (e.g., an empty bucket closest to the previously stored bucket with the same hash (index)) is found and the value associated with the new entity is stored there, the index being a corresponding serial value of the bucket. It can be seen that in open addressing, no linked list and no pointer is required. Therefore, while there is no memory penalty, additional time required for storing (PUT) time, retrieval (GET) time, and higher delete (DELETE) time leads to larger compute time consumption.

Thus, existing solutions for collision avoidance techniques either lead to larger memory footprint, a higher compute time, or both.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the disclosure receive a first key-value pair for a data group. The first key-value pair comprises a first key and a first value. The data group comprises a first array comprising a first plurality of buckets, and a second array comprising a second plurality of buckets. A first hashed key of the first key is generated using a hash function. Using the first hashed key and a quantity of the first plurality of buckets, a first index, comprising a first plurality of bits, is generated. A group of most significant bits is selected from the first plurality of bits to form a tag. The first tag comprises a first quantity of bits less than a second quantity of bits in the first plurality of bits. A second key-value pair for the data group is received. The second key-value pair comprises a second key and a second value. A second hashed key of the second key is generated using the hash function. Using the second hashed key and the quantity of the first plurality of buckets, a second index comprising a second plurality of bits is generated. A second tag is generated using the second index. Based on determining that the second index is equal to the first index, the second value is stored in the second array along with the second tag. A value of a subsequent key-value pair that results in an index having a value equal to the first index is stored in the second array along with its tag, forming a linked list with the second value.

BRIEF DESCRIPTION OF THE DRAWINGS

The present description will be better understood from the following detailed description read in the light of the accompanying drawings, wherein.

Corresponding reference characters indicate corresponding parts throughout the drawings. In the figures, the systems are illustrated as schematic drawings. The drawings may not be to scale. Any of the drawings may be combined into a single example or embodiment.

DETAILED DESCRIPTION

Figure 1:
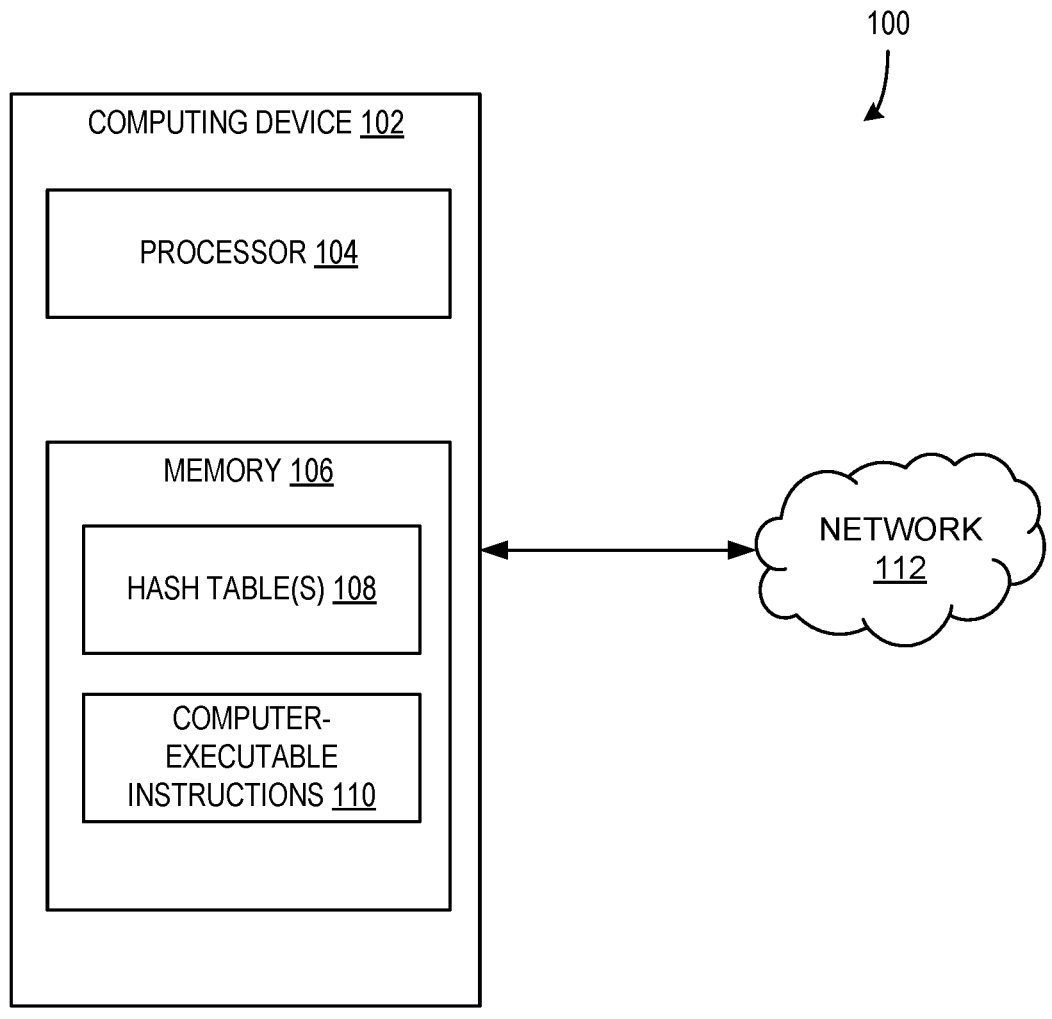
FIG. 1 is a block diagram illustrating a system according to an example.

Aspects of the disclosure provide systems and methods for reducing a memory footprint of a hash table that employs chaining as a collision avoidance solution. The methods and systems disclosed herein address the challenge of using the chaining (which provides the advantage of fast retrieval and usage of less compute resources), while at the same time reducing a memory footprint by storing only those bits that contain useful information from the total number of bits that represent the hashed key and the linked list pointer, without storing the other bits of the hashed key and the linked list pointer that do not contain useful information. In some examples, parts of the hashed key and the linked list pointer associated with the linked list that contain useful data are stored, while parts of the data from the hashed key and the linked list pointer that contain no useful information are not stored.

Conventionally, solutions for collision avoidance techniques either lead to larger memory footprint, a higher compute time, or both. As the number of collisions increases, the performance of chaining-based hash tables might degrade. More collisions mean longer linked lists or data structures attached to the same hash index. In worst-case scenarios, this can degrade time complexity from an expected O(1) to O(n) for operations like retrieval or insertion. Further, chaining often requires additional memory allocation for pointers or references to store collisions. This overhead can be substantial when dealing with large datasets or when the hash table becomes densely populated.

The present disclosure addresses these issues and more by providing a system and method for reducing a memory footprint of a hash table that employs chaining as a collision avoidance solution, while also providing the advantage of fast retrieval and usage of less compute resources. For example, aspects of the present disclosure minimize memory usage without sacrificing computational overhead, without increasing average collision chain length (e.g., open addressing linear/quadratic probing), without requiring the computing of secondary indices or hashes (e.g., open addressing double hashing), and/or without allocating memory frequently (e.g., separate chaining).

In some examples, when a hash of a key is used as a tag (hereinafter hashed key or key) in a hash table, the hash table comprises at least as many buckets as there are indices. Further, to reduce a number of the indices (and the memory usage), a modulo operation is used that constrains a maximum number of indices to a number of buckets used in a hash table, thereby reducing the number of indices in a hash table because the modulo operation is a many-to-one mapping. Moreover, the hash table stores indices but does not store keys, which may be a string consuming considerable memory if stored.

Further, various aspects of the systems and methods described herein lead to an advantage in memory utilization in a computer system by providing a 5× to 2000× reduced memory footprint over the baseline hash table implementation when using chaining as a collision avoidance system, while also not resulting in an increase in time to perform for example, PUT, GET or DELETE operations. In addition, by limiting the hash table size to multiples of 2, indices are computed faster with bit masks instead of the expensive modulus (%) operator, thus the key and the linked list pointer can be packed faster with bit masks.

FIG. 1 is a block diagram illustrating a system 100 configured to reduce a memory footprint of a hash table that employs chaining as a collision avoidance solution. In some examples, the system 100 generally includes a computing device 102 coupled to network 112.

The network 112 may include, without limitation, a local area network (LAN), a wide area network (WAN) (e.g., the Internet, etc.), a mobile network, a virtual network, and/or another suitable public and/or private network capable of supporting communication among two or more of the components illustrated in FIG. 1, or combinations thereof.

The computing device 102 comprises a processor 104 and a memory 106 that stores hash tables 108 and computer-executable instructions 110. In some examples, a hash of a key is used as a tag (hereinafter hashed key or key) in the hash table 108. For example, with reference now to FIG. 2, a simplified block diagram of an example hash table (e.g., the hash table 108) is provided to illustrate a basic topology of the hash table 108.

Figure 2:
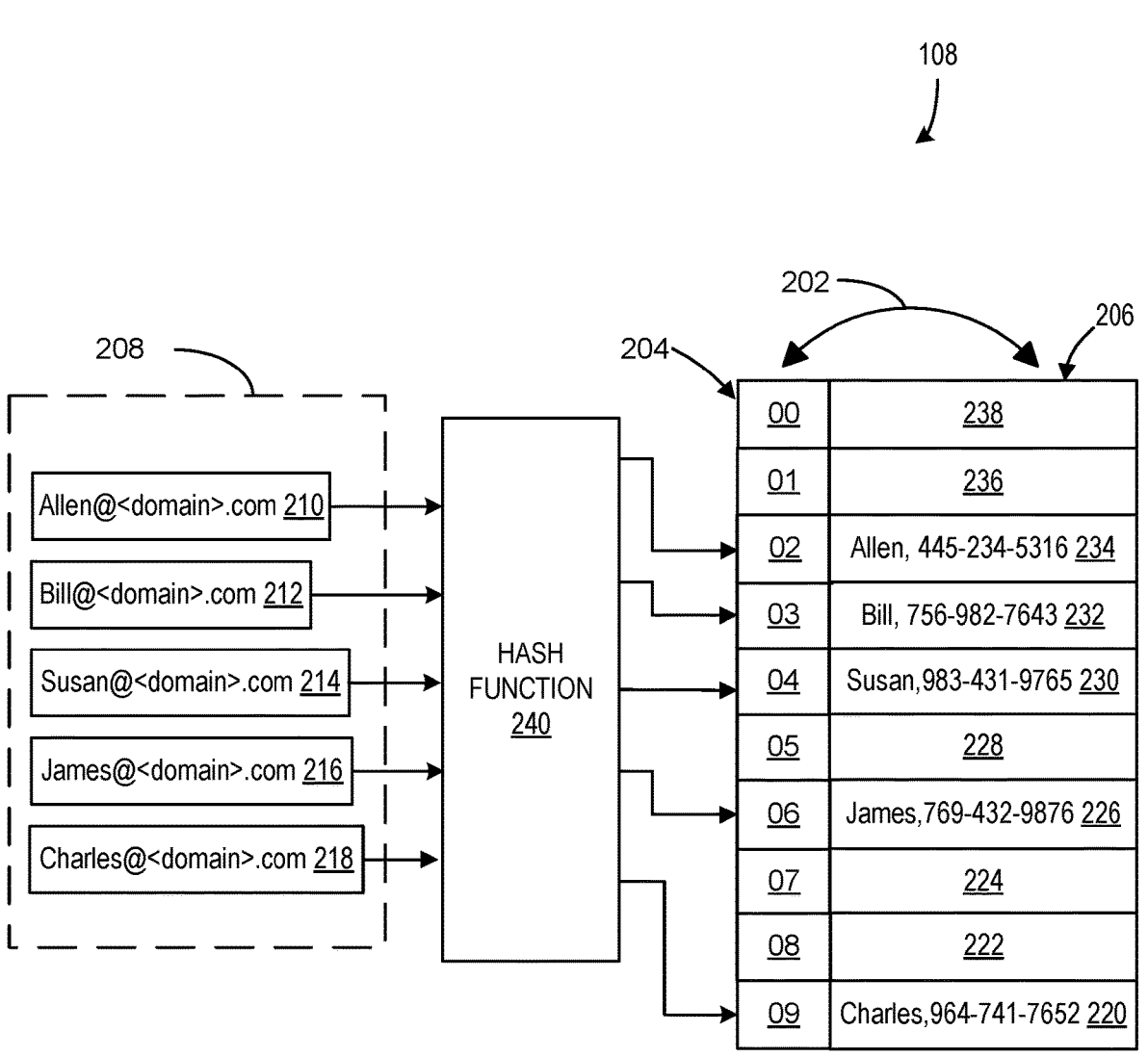
FIG. 2 illustrates a block diagram of an example hash table according to an example.

As shown in FIG. 2, buckets 202, indices 204, values 206, keys 208 and an arbitrary hash function 240 is provided. Example email IDs are used as the keys 210-218 of key-value pairs. The storage depicts the indices 204 (e.g., 00-09) relating to the keys 208 generated by the application of the hash function 240 and the performance of modulo operations using values 206 of hashed keys as numerator and the number of buckets (e.g., m) as denominator. Exemplary values 206 of the key-value pairs are shown from 220-238. The values 206 comprise exemplary names and phone numbers. As can be seen, some of the buckets 202 in FIG. 2 have no values because if the indices 204 are stored in increasing order, some of the indices 204 may not have a corresponding key 208. The buckets 202 are left blank to accommodate future key-value pairs, should the key 208 of an incoming pair take a value that is currently unfilled.

In some examples, the hash table 108 comprises at least as many of the buckets 202 as there are of the indices 204. Further, to reduce a number of the indices 204 (and the memory 106 usage), a modulo function (represented by a % sign) is used where a value of the index (h (key)) is used as the numerator and a number of buckets (m) is used as the denominator, as given in Equation (1) below.

$$idx=h(\text{key}) \ \% \ m \tag{1}$$

Using the modulo operation as shown above in Equation (1) constrains a maximum number of indices to a number of the buckets 202 used in the hash table 108. In some examples, an array that comprises a linked list of the values 206 is used and a linked list pointer at each index is used to point to a corresponding entry in the array comprising the linked list of values.

Figure 3:
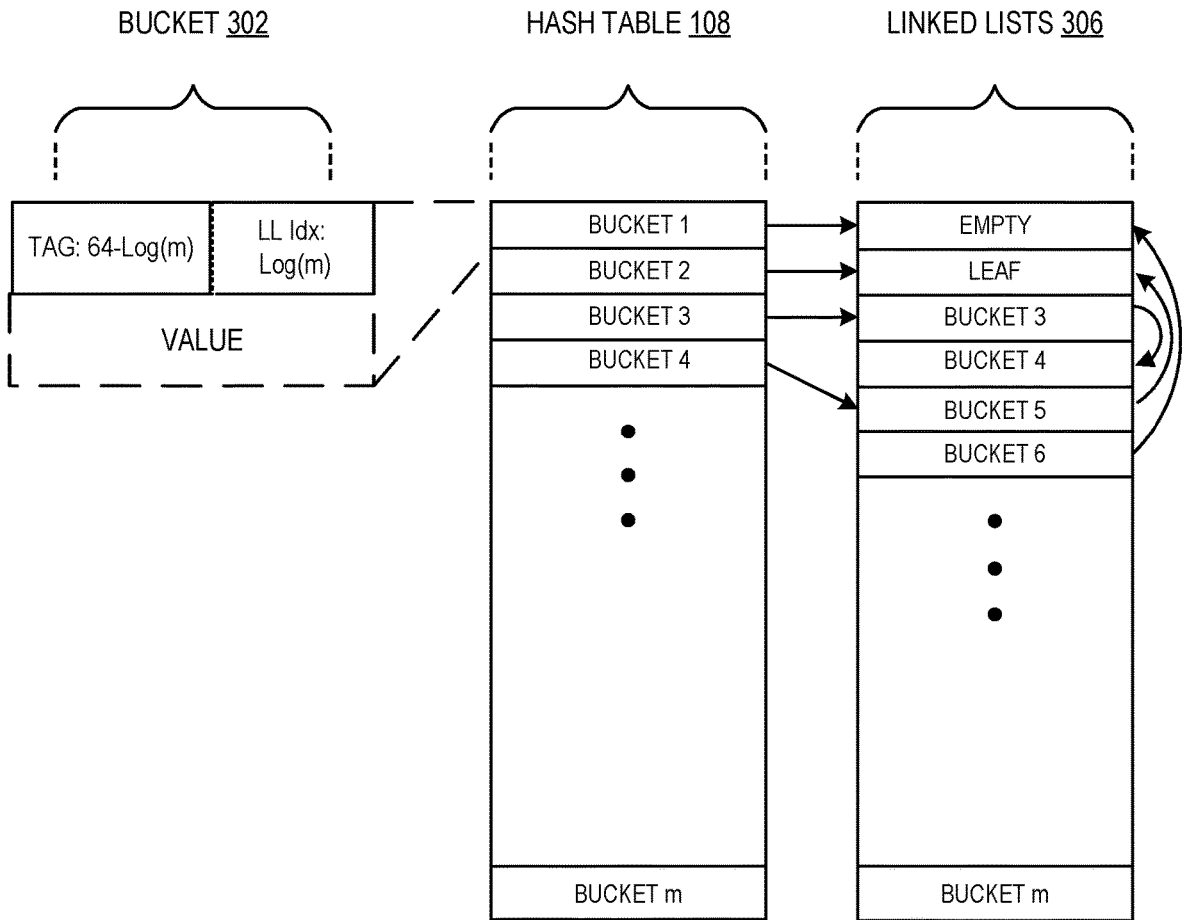
FIG. 3 illustrates a block diagram of a chaining solution for the hash collision according to an example.

In an example, there are one or more values linked to a value to which the linked list pointer points, as shown in FIG. 3 which illustrates an example of implementation of a chaining technique of collision avoidance. As such, the memory 106 requirements can be summed up in the equations below.

$$\text{Memory} = m \times \text{size}_{bucket} \tag{2}$$

$$\text{size}_{bucket} = \text{size}_{key} + \text{size}_{pointer} + \text{size}_{value} \tag{3}$$

Moreover, the hash table 108 stores the indices 204 but does not store the keys 208, which may be a string consuming considerable memory if stored. It should be noted that in a 64-bit computing device, the indices and the linked list pointers are 64-bit binary numbers. In the chaining solution of collision of indices, a first array contains the indices, the linked list pointer, and the value and a second array contains the linked lists. Storing a 64-bit tag and a 64-bit pointer adversely impacts a memory footprint of the computing device 102 being used. The methods and systems disclosed herein address the challenge of using the chaining (that provides the advantage of fast retrieval and usage of less compute resources), while at the same time reducing a memory footprint by storing parts of the tag and pointer that contain useful information without storing parts of the tag and pointer that do not contain useful information, as discussed herein.

With continued reference to FIG. 3, the exemplary implementation of the chaining technique of collision avoidance results in two arrays, one depicting the hash table 108 and the other depicting the linked lists 306 with the number of buckets in each being 'm', as discussed above. Details of a bucket are shown at 302. Some of the buckets 302 are shown linked together as depicted by curved arrows. For example, buckets 3 and 4 of the linked list 306 are linked together and only one pointer from bucket 3 of the hash table 108 is shown to bucket 3 of the linked lists 306. This is because two different key-value pairs generate the same index though the values are different. The two different values (at buckets 3 and 4) are linked together as shown in FIG. 3.

In some examples, hash tables (e.g., the hash table 108) automatically resize when their population count reaches a fraction of the number of buckets allocated known as the load factor ($\alpha$). At this threshold, the hash table 108 resizes by a factor known as the scaling factor ($\beta$). As such, the hash table 108 has $\beta/\alpha$ buckets (m) per item (n) as soon as the hash table 108 resizes. In one example, the memory 106 is minimized linearly by tuning this load factor up and the scaling factor down, as shown by Equation (4) below.

$$\text{Memory} = \frac{\beta}{\alpha} n \times \text{size}_{bucket} \qquad (4)$$

The modulo operation discussed above reduces the number of indices in the hash table 108 because it is a many-to-one mapping. Thus, while the hashed key values are not the same (e.g., $h(key_1) \neq h(key_2)$), after the modulo operation, the two indices may be the same as represented by the equation below.

$$idx_1 = idx_2 = h(key_1)\% \ m = h(key_2)\% \ m \qquad (5)$$

In one example, when the two indices are the same, a linked list array and a linked list pointer are utilized. An index is produced by performing a modulo 'm' operation on a hashed key, the key being a string that is associated with a corresponding value in a key-value pair, and the hashed key is the result of performing a hash operation on the key using a hash function, resulting in a number. The modulo operation constrains the index to be within the range of the number of buckets in the hash table 108. For example, in a 64-bit machine, the index will be a 64 bit number and the linked list pointer is also a 64-bit number. Thus, conventionally, this requires two 64-bit numbers amounting to a total of 128 bits to store the complete information about the key and the linked list pointer. However, in the examples described herein, chaining collision handling is used without the additional memory overhead by packing the linked list pointer and the hashed key into 64 bits (i.e., same space as would be otherwise used by the hashed key) without omitting any relevant information. In a chained hash table (sometimes also called a hash map) implementation, every entry in a linked list is rooted at index idx=h(key) % m. The value of the hashed key is fully reconstructed by only adding the index to h(key)//m, as shown in Equation (6) below.

$$m * (h(key) \ // \ m) + idx = m(h(key) \ // \ m) + h(key) \% \ m = h(key) \qquad (6)$$

With a hash table of a size that is a multiple of 2, Equation (6) is computed using bit masks, as shown below in Equation (7).

$$h(key) \ \& \sim (m-1)|idx = h(key) \ \& \sim (m-1)|h(key) \ \& \ (m-1) = h(key) \qquad (7)$$

Figure 4:
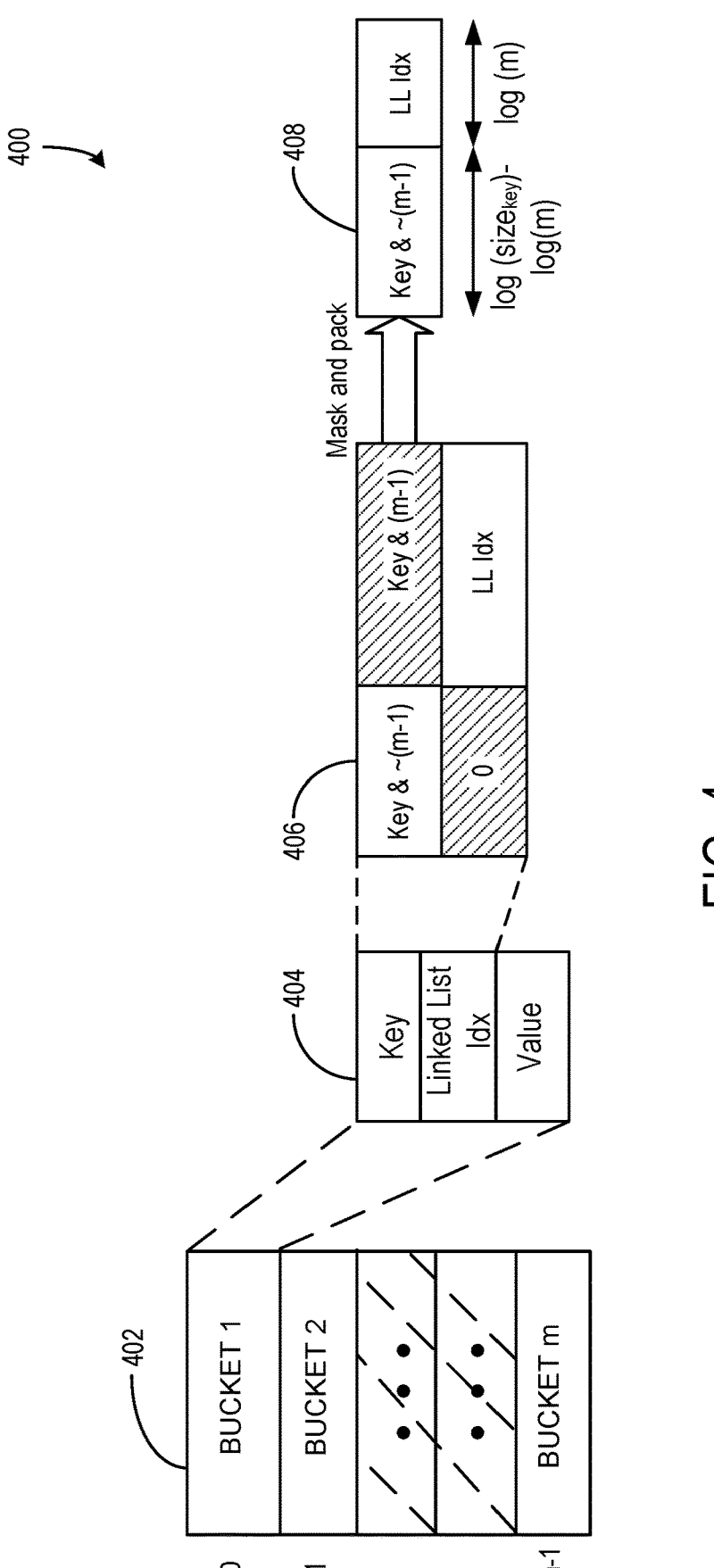
FIG. 4 illustrates a block diagram for reducing memory footprint in a chaining solution of the hash collision according to an example.

Hence, for m buckets in the hash table at a hashed key h(key), only the most significant h(key) & ~(m−1) bits for the index are stored and only log (m) bits for the linked list pointer, that points to the corresponding linked list, are stored as shown in FIG. 4.

FIG. 4 shows a simplified example block diagram 400 illustrating implementation of an example chaining method and a concept of packing the same information in fewer number of bits, that is half the bits used in conventional methods without sacrificing any relevant information. FIG. 4 depicts an example implementation, that uses 'm' buckets (shown at 402) both for the hash table 108 and the linked list and an example hashed key shown as 'Key.' As illustrated in FIG. 4, while an existing method (shown at 406) comprises 'Key & ~(m−1)' and 'Key & (m−1)' bits for the hashed key, the method described herein (shown at 408) uses only 'Key & ~(m−1)' most significant bits of the original hashed key value and only 'log (m)' least significant bits of the original linked list pointer value to completely identify an entry. At 406, the parts that do not carry useful information are shown as shaded. These portions are omitted while storing the Key and the pointer shown as LL Idx. Only the masked and packed portions shown at 408 are stored, resulting in a 2× savings in the memory consumptions, while taking the same compute time in retrieving the relevant information, or executing, for example, the 'GET', 'PUT' and 'DELETE' commands.

As such, all the information required to know an item's full hash value and linked list pointer (also called linked list index) is packed into a space previously occupied only by the hash value. The same hash value is being used, but stored in less space. For example, in a 64-bit machine, where the hashed value is a 64-bit number and the linked list pointer is also a 64-bit number, rather than storing all 128 bits for complete information at an entry, only 64 bits are stored in the system and methods described herein.

In some examples, two design features are integrated to create a final memory efficient hash table data structure implementation illustrated in FIG. 3. The hash table 108 is implemented with two separate arrays that resize together. The hash table array stores all the collision chain root nodes (that contain the hashed keys, the linked list pointers, and the values rooted at various indices), and all collision chain children are stored in the linked lists array (that contain all the values rooted at corresponding indices, with multiple values corresponding to a single index being linked together to form a linked list). In some examples, the linked list children are stored separate from the main hash table to ensure that the linked list children are not confused for the root node of other chains without using any additional memory to designate chain information. Like the hash table 108, the linked lists array has a size of a power of 2. If the linked lists were half the size of the hash table 108, with a standard load factor of ¾, the hash table would frequently saturate before the load factor is met, triggering expensive rehashing. Therefore, in some examples, a next minimum size is chosen that turns out be equal to the size of the hash table, as shown in FIG. 3.

Assuming, for example, a 64-bit machine, keys are hashed into 64 bits and packed into the same 64 bits with the linked list index. There are two reserved linked list index values: 0 indicates that the bucket is empty; and 1 indicates that the bucket is a leaf node. The buckets at index 0 and 1 in the linked lists table are kept empty and not used. An example scaling factor of 2 (the smallest power of 2) is chosen to maintain array sizes that are powers of 2, and an example load factor of ¾ can be selected. In other examples, other values of scaling factor and load factor can be chosen without affecting the performance of the methods and systems disclosed herein.

Figure 5A:
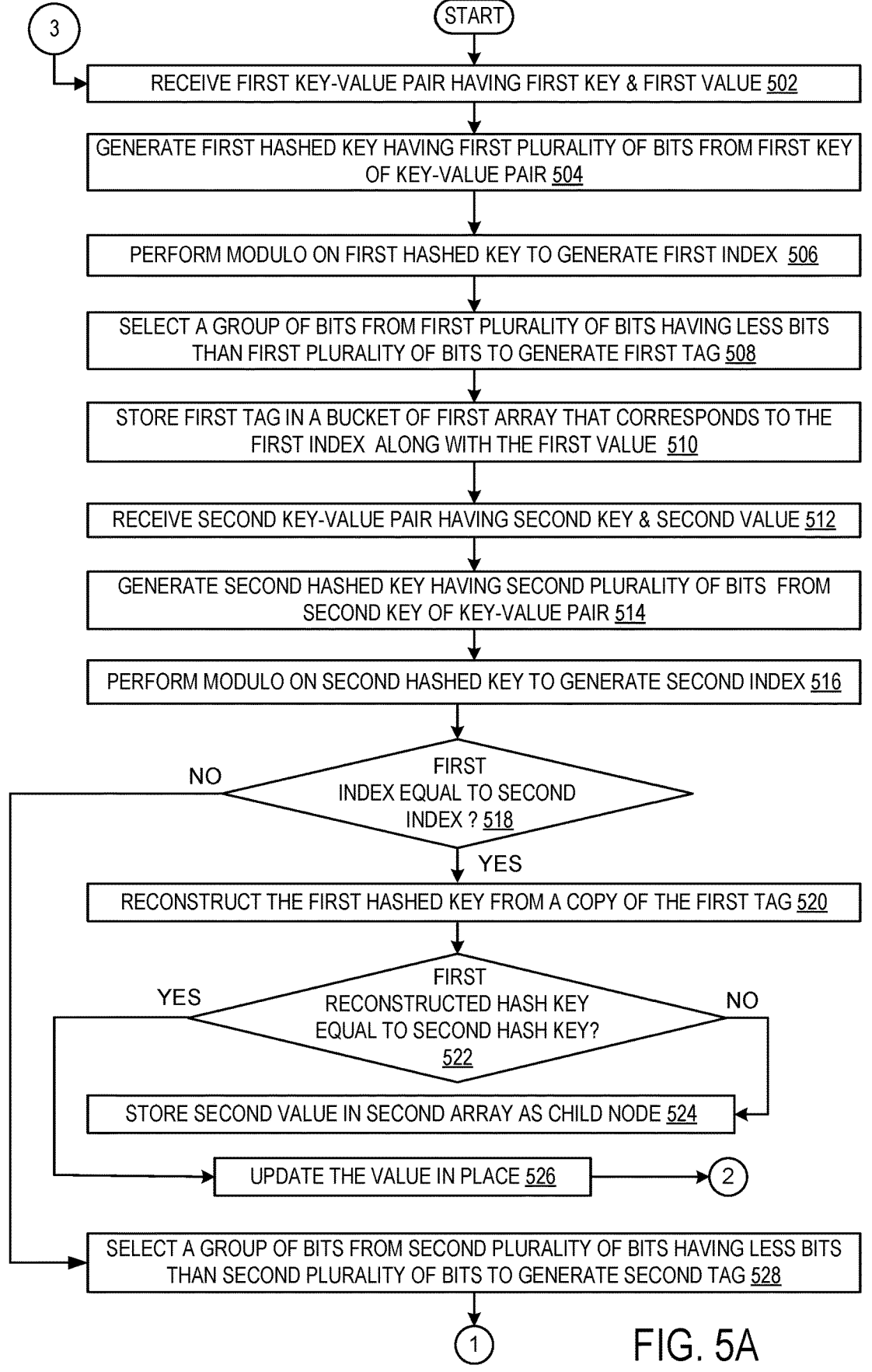
FIGS. 5A and 5B illustrate a flowchart providing exemplary operations to store a first key-value pair and a second key-value pair in two arrays that constitute a memory efficient hash table according to an example.
Figure 5B:
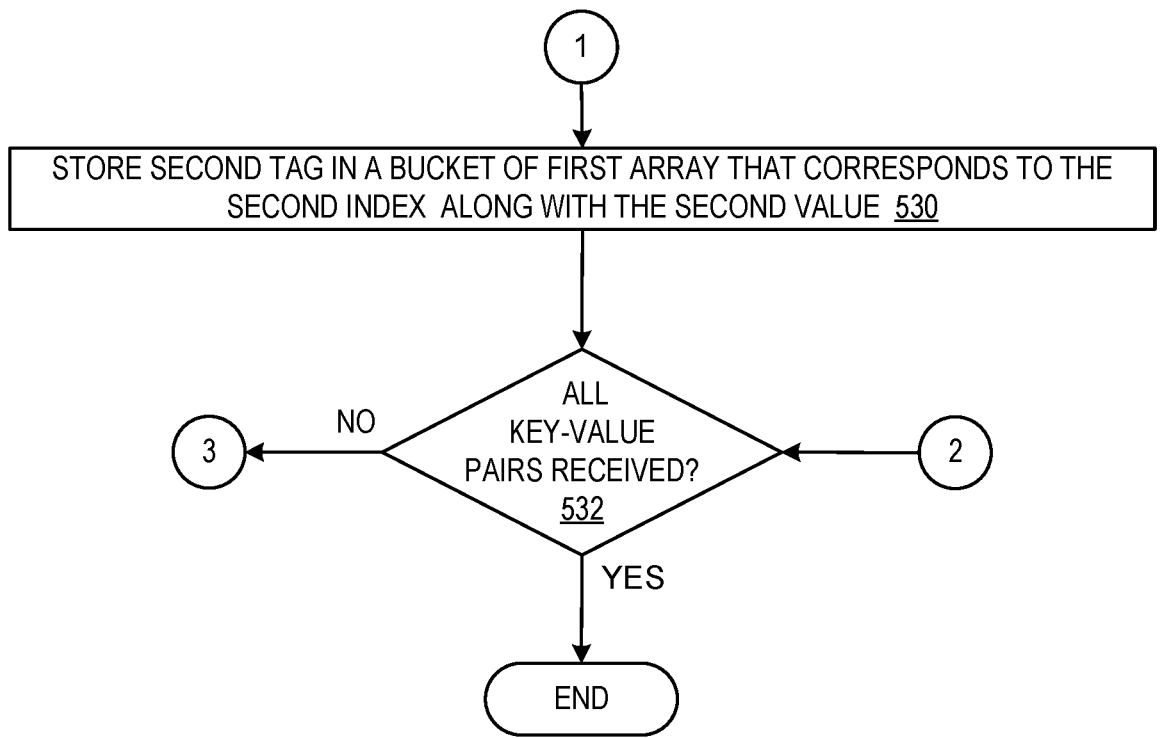
Figure 6:
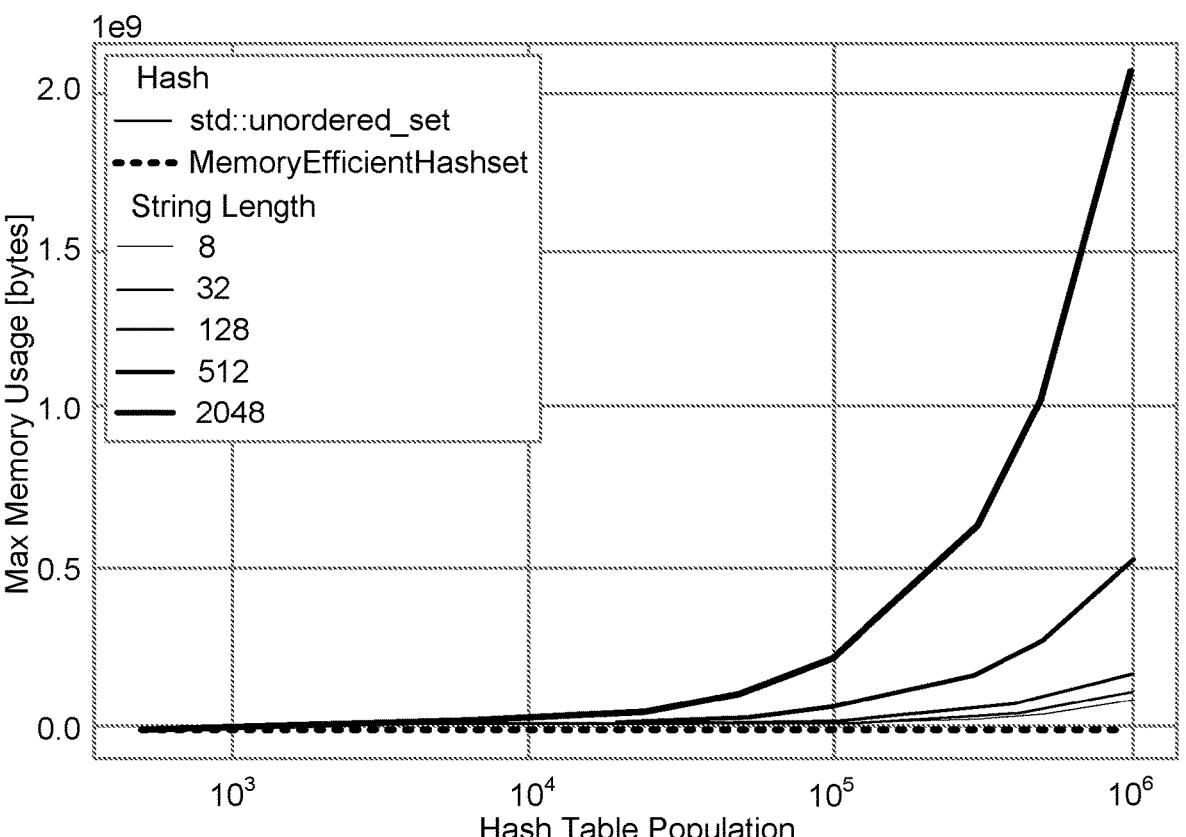
FIGS. 6-9 illustrate graphs comparing a benchmark standard with the results obtained in examples of the systems and methods disclosed herein.
Figure 7:
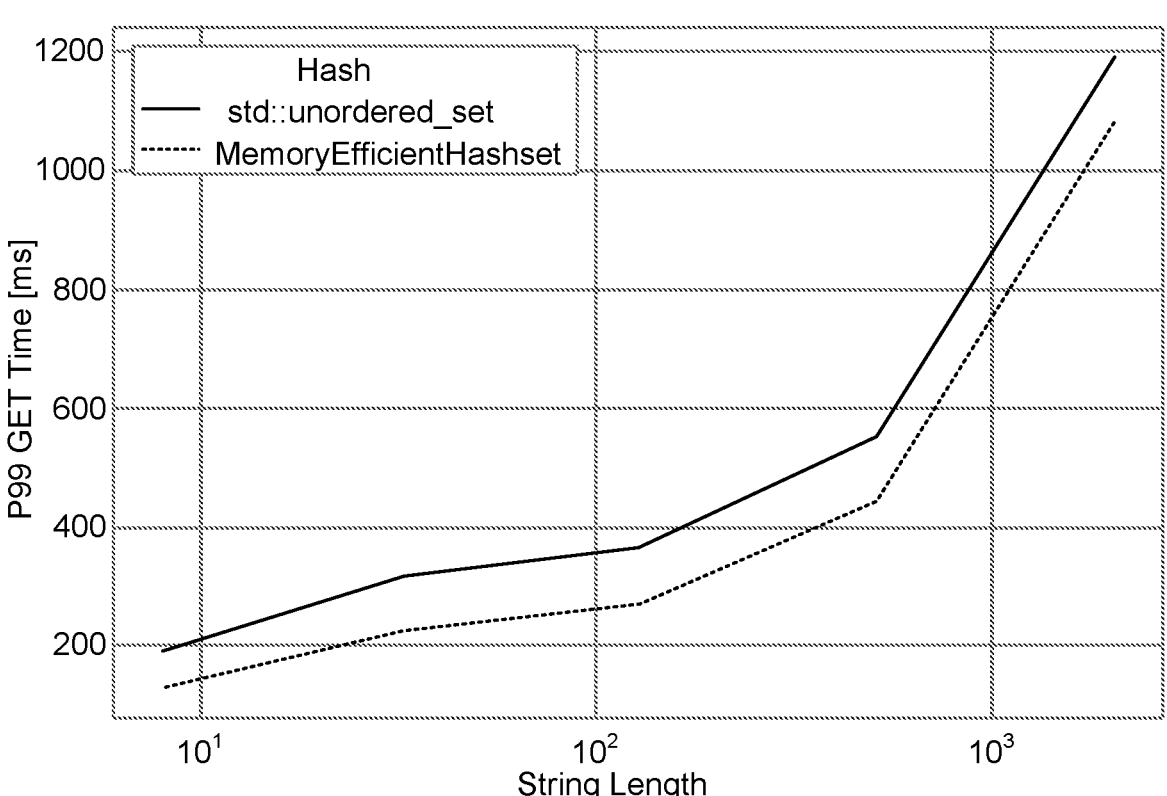
Figure 8:
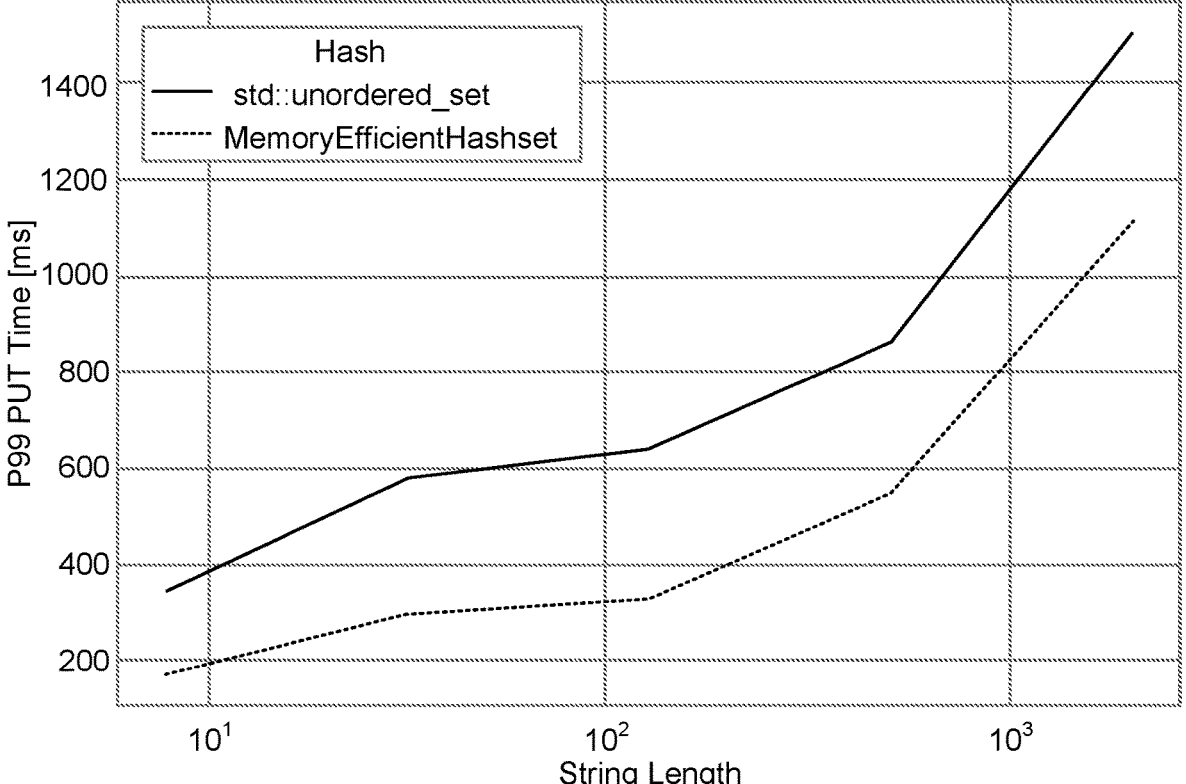
Figure 9:
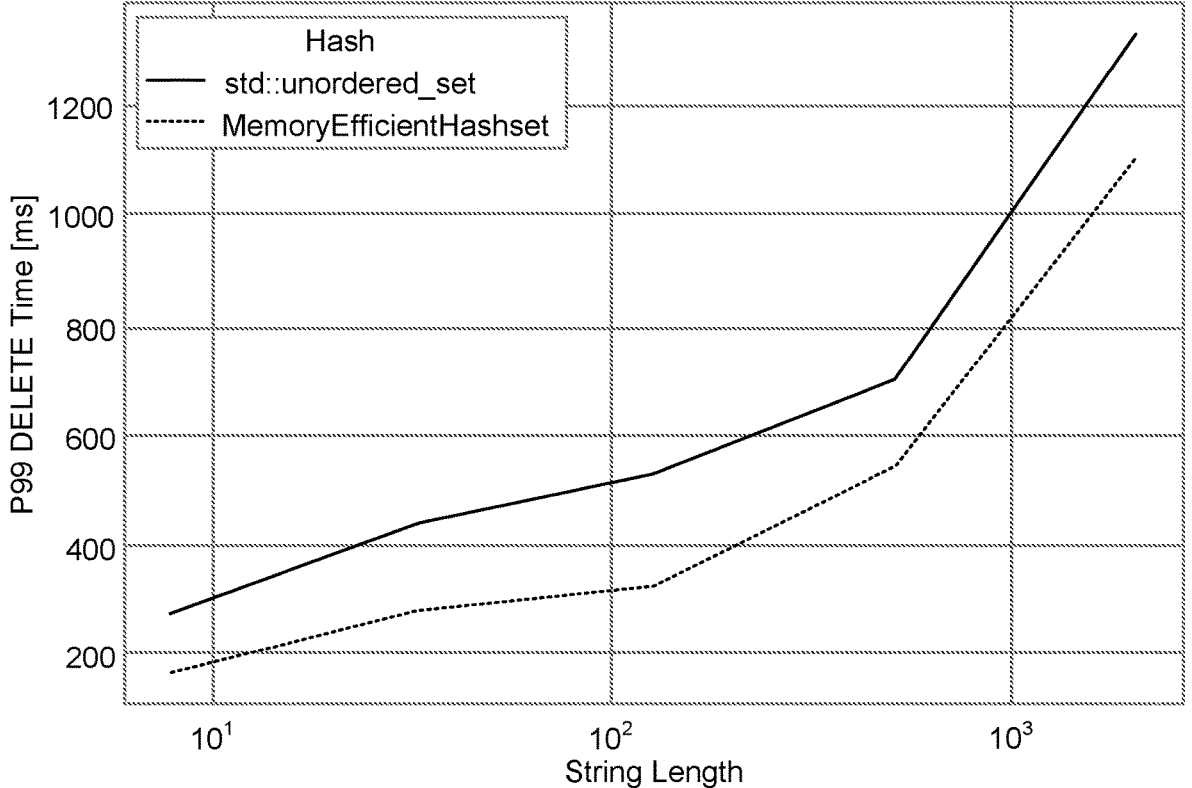

FIGS. 5A and 5B illustrate a flowchart for exemplary operations of an example method used in the disclosure. In FIG. 5A, the method begins at 502, where a first key-value pair, comprising a first key and a first value, is received. At 504, a hash function (e.g., SH-1, SHA-256 or MD5) is applied to generate a first hashed key from the first key. The first hashed key comprises a first plurality of bits. A modulo function is performed on the first hashed key at 506, using the first hashed key as a numerator and the number of buckets used in a hash table (e.g., the hash table 108) as a denominator. In one example, both the hash table and the linked list use the same number of buckets denoted by letter 'm.' In other examples, the number of buckets in the linked list may be different from the number of buckets in the hash table. The modulo operation generates a first index. At 508, a group of most significant bits from the first plurality of bits are selected to form a first tag. In one example, in a 64-bit machine, the hashed key comprises a multi-bit binary number having 64 bits. Further, assuming that m is an integer multiple of 2, $\log_2$ (m) least significant bits can be removed, and the balance $64-\log_2$ (m) most significant bits form the group, which is used as the first tag. At 510, the first tag is stored in a bucket of the first array that corresponds to the first index, along with the first value.

When a linked list pointer is stored in the first array, as shown in FIG. 4, $\log_2$ (m) least significant bits of a linked list pointer contain the relevant information, and only $\log_2$ (m) least significant bits of the originally generated 64-bit linked list pointer (e.g., in a 64-bit machine) are stored. Hence, it can be realized that, in aspects of the present disclosure, only 64 bits are stored in place of 128 bits that would otherwise be stored (in the example 64-bit machine), resulting in reducing the memory footprint of a computing device (e.g., the computing device 102) by at least a factor of two.

At 512, a next key-value pair, comprising a second key and a second value, is received. At 514 and 516, operations similar to those performed at 504 and 506 for the first key-value pair, are performed to generate a second hashed key having a second plurality of bits and a second index. At 518 it is checked whether first index is equal to the second index. In case the first index is equal to the second index, it may indicate that two keys of the two key-values pairs generate the same index. It may further lead to storing the second value of the second key-value pair in the second array that may generate a linked list, as discussed herein. If the first index is equal to the second index, then at 520, the first hashed key is reconstructed using a copy of the first tag as described above at Equation (7). At 522 the second hash key is compared with the reconstructed first hash key to check if the two are equal. If the second hashed key is not equal to the reconstructed first hashed key, it shows that the keys of the first key-value pair and the second key-value pair hash to a common index because of the modulo operation, while the first value and the second value are different. In this case, at 524, the second value is stored in the second array as a child node of a prospective linked list. In this case a pointer from the first value stored in the first array would point to this linked list. If the second hashed key is equal to the reconstructed first hash key, at 526 the first value of the first key-value pair is updated in place, because in this case the first index is equal to the second index and the first hashed key is equal to the second hashed key that necessitates updating the first stored value in place. However, if the first index is not equal to the second index, at 528 a second group of bits from the second plurality of bits, that is less than the second plurality of bits, is selected to form a second tag. At 530 in FIG. 5B, the second tag is stored in a bucket of the first array that corresponds to the second index along with second value. At 532 in FIG. 5B, a check to see if all the key-value pairs have been received, is performed. If all the key-value pairs have been received, the operation ends in this case, as shown in FIG. 5B.

Further, after completion of operation at 526, a check is performed at 532, to see if all key-value pairs have been received, as shown by connectors '2' from FIG. 5A to FIG. 5B.

Moreover, if all key-value pairs have not been received at 532, the flowchart moves back to FIG. 5A as shown as shown by connectors '3' from FIG. 5B to FIG. 5A. A next iteration of all the operations is performed until all key-value pairs have been received.

Figure 10:
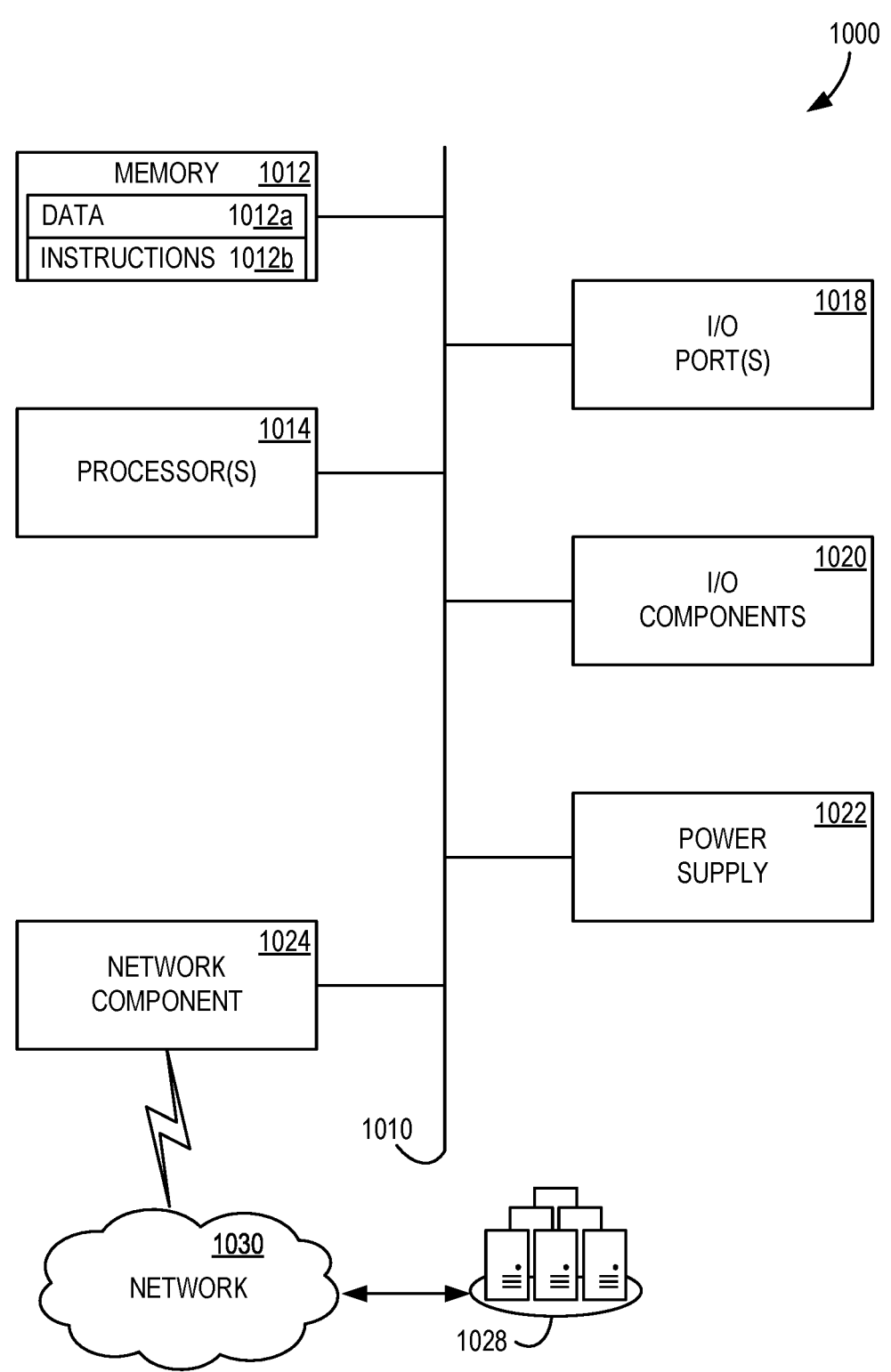
FIG. 10 illustrates a block diagram of an example computing environment suitable for implementing some of the various examples disclosed herein.

FIG. 10 illustrates a block diagram of an example computing device 1000 that may perform the various functions performed in the disclosed methods and system. Computing device 1000 has at least a processor 1014 and a memory area 1012 (or memory 1012) that holds program code (instructions) 1012*b*, and data 1012*a*. Memory area 1012 is any device allowing information, such as computer executable instructions and/or other data, to be stored and retrieved. For example, memory area 1012 may include one or more random access memory (RAM) modules, flash memory modules, hard disks, solid-state disks, and/or optical disks. Program code 1012*b* comprises computer executable instructions and computer executable components.

I/O components 1020 may comprise a keyboard and a computer monitor, which may also or instead include a touchscreen, mouse, trackpad, and/or other I/O devices. Network component 1020 permits communication over a network 1030 with remote nodes 1028, which may represent another implementation of computing device 1000, a cloud service, or data source. Computing device 1000 has I/O ports 1018 that enable receiving from and transmitting to I/O components 1020. The computing device 1000 also has a power supply 1022. The components of the computing device 1000 communicate over a bus 1010.

Computing device 1000 generally represents any device executing instructions (e.g., as application programs, operating system functionality, or both) to implement the operations and functionality described herein. Computing device 1000 may include any portable or non-portable device including a mobile telephone, laptop, tablet, computing pad, netbook, gaming device, portable medium player, desktop personal computer, kiosk, embedded device, and/or tabletop device. Additionally, computing device 1000 may represent a group of processing units or other computing devices, such as in a cloud computing system or service. Processor 1014 may include any quantity of processing units and may be programmed to execute any components of program code 1012*b* comprising computer executable instructions for implementing aspects of the disclosure. In some embodiments, processor 1014 is programmed to execute instructions such as those illustrated in the figures.

Tests

Tests were conducted to check the performance of an example of the current implementation of the memory efficient hash table.

Ran from a US West 64 Core AVD Workstation.

Measured P99 Time for 100K GET, PUT and DELETE operations over 100 trials.

Measured Max Memory Footprint.

The above measurements were repeated across 10 different hash map population sizes ranging from 500 to 1 M and across a string of 5 different string lengths ranging from 8 to 2048.

Further, the tests were repeated with a baseline std::unordered_map, and the example implementation of the memory efficient hash table as a memory efficient hash set. For example, as shown in FIGS. 6-9, graphs of the results comparing the std::unordered_map with the memory efficient hash table architecture are shown.

Several features can be observed from FIGS. 6-9. For example, the memory efficient hash table does not increase memory footprint with increased string length (key size), the baseline increases linearly in memory footprint with increased string length. The memory efficient hash table consistently uses 5× to 2000× less memory across key sizes as compared to the baseline. The memory efficient hash table executes GET, PUT, and DELETE commands 1.5× faster than the baseline at a hash set population of 1 M. They both scale linearly with string length due to the hash function complexity, but the constant portion (due to the hash table implementation) is 1.5× lower.

ADDITIONAL EXAMPLES

An example use of a hash table, as disclosed herein, is in storing large datasets and quickly retrieving them. By efficiently handling collisions and using a well-designed hash function, a hash table provides fast access to stored data, making it suitable for managing large datasets with quick retrieval requirements.

Another example of use of the hash table as disclosed herein is by airlines for use in international travel. In this case, the details of a passenger comprise a host of data items and not merely a name and an ID. Passenger data may include passport and visa details, phone number, email ID, address at destination, nationality, need for special assistance (e.g., a wheelchair), choice of meals, need for specific seat location and the like. All the passenger details can be stored as 'value', while retrieval can be done using a numerical index. Even if a number of passenger end up with the same index, the linked list can be quickly searched to locate the passenger. Because there will be tens of thousands of passengers, a reduction in consumption of memory by at least a factor of 2 will lead to a large overall reduction when using the methods and system disclosed in the disclosure.

Another practical application of the methods and systems described herein is in a telephone book application. Similarly, social security databases can use a hash table architecture described herein.

In India, an Aadhaar Number is used as an identity of a person. All data related to the person such as address, email ID, phone number, and biometric data is stored in the Aadhaar Database. India's current population is over a billion. Hence, an Aadhaar Database, if implemented in an architecture of the hash table described herein, will save a huge amount of computer memory.

An example computer system comprises: a processor; and a memory having stored thereon computer-readable instructions, that when executed by the processor cause the processor to: receive a first key-value pair for a data group, the first key-value pair comprising a first key and a first value, the data group comprising a first array comprising a first plurality of buckets and a second array comprising a second plurality of buckets; generate a first hashed key of the first key using a hash function; using the first hashed key and a quantity of the first plurality of buckets, generate a first index comprising a first plurality of bits; select a group of most significant bits from the first plurality of bits to form a first tag, the first index comprising a first quantity of bits less than a second quantity of bits in the first plurality of bits; receive a second key-value pair for the data group, the second key-value pair comprising a second key and a second value; generate a second hashed key of the second key using the hash function; using the second hashed key and the quantity of the first plurality of buckets, generate a second index comprising the second plurality of bits; determine that second index is equal to the first index; based on determining that the second index is equal to the first index, store the second value in the second array at a second address different from a first address of the first value; and form a linked list in the second array including the second value.

An exemplary method using a computer comprises: receiving a first key-value pair for a data group, the first key-value pair comprising a first key and a first value, the data group comprising a first array comprising a first plurality of buckets and a second array comprising a second plurality of buckets; generating a first hashed key of the first key using a hash function; using the first hashed key and a quantity of the first plurality of buckets, generating a first index comprising a first plurality of bits; selecting a group of most significant bits from the first plurality of bits to form a first tag, the first tag comprising a first quantity of bits less than a second quantity of bits in the first plurality of bits; receiving a second key-value pair for the data group, the second key-value pair comprising a second key and a second value; generating a second hashed key of the second key using the hash function; using the second hashed key and the quantity of the first plurality of buckets, generating a second index comprising the second plurality of bits; determining that second index is equal to the first index; based on determining that the second index is equal to the first index, storing the second value in the second array at a second address different from a first address of the first value; and forming a linked list in the second array including the second value.

An exemplary non-transitory computer storage medium has stored thereon computer-readable instructions, that when executed by a processor cause the processor to: receive a first key-value pair for a data group, the first key-value pair comprising a first key and a first value, the data group comprising a first array comprising a first plurality of buckets and a second array comprising a second plurality of buckets; generate a first hashed key of the first key using a hash function; using the first hashed key and a quantity of the first plurality of buckets, generate a first index comprising a first plurality of bits; select a group of most significant bits from the first plurality of bits to form a first tag, the first tag comprising a first quantity of bits less than a second quantity of bits in the first plurality of bits; receive a second key-value pair for the data group, the second key-value pair comprising a second key and a second value; generate a second hashed key of the second key using the hash function; using the second hashed key and the quantity of the first plurality of buckets, generate a second index comprising the second plurality of bits; determine that second index is equal to the first index; based on determining that the second index is equal to the first index, store the second value in the second array at a second address different from a first address of the first value; and form a linked list in the second array including the second value.

Alternatively, or in addition to the other examples described herein, examples include any combination of the following:

based at least on the quantity of the plurality of first buckets is a multiple of 2, selecting the group of most significant bits from the first plurality of bits by:

computing a log to the base 2 value of the quantity of the first plurality of buckets;

subtracting the computed value from a maximum number of bits that a processor of the computer is capable of processing in one computing cycle to produce a first integer; and using the first integer value as the number of elements in the group of the most significant bits.

when the pointer comprises a number of bits equal to the maximum number, a number of least significant bits out of the number of bits of the pointer is stored as effective pointer value, wherein the number of the least significant bits is equal to the computed value.

the first array and the second array resize together.

when a ratio of occupied buckets to the total number of buckets is designated as a load factor, the first array and the second array resize when the load factor reaches a threshold value.

the quantity of the first plurality of buckets in the first array is equal to the quantity of the second plurality of buckets in the second array.

when the maximum number of bits that a processor of the computer is capable of processing in one computing cycle is 64, and the quantity of the first plurality of buckets is m, the number of elements in the group is equal to $64\text{-}\log_2$ m.

Exemplary Operating Environment

The operations described herein may be performed by a computer or computing device. The computing devices comprise processors and computer readable media. By way of example and not limitation, computer readable media comprise computer storage media and communication media. Computer storage media include volatile and non-volatile, removable, and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device", "computer", and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The term "quantity" is intended to mean a "number", (e.g., 17, 19.6 and the like). The terms "quantity" and "number" are used interchangeably in the disclosure. The words such as "first" and/or "second" are used merely to distinguish one object from another. These words do not connote any chronological order or precedence.

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized method comprising:

receiving a first key-value pair for a data group, the first key-value pair comprising a first key and a first value, the data group comprising a first array comprising a first plurality of buckets and a second array comprising a second plurality of buckets;

generating a first hashed key of the first key using a hash function;

using the first hashed key and a quantity of the first plurality of buckets, generating a first index comprising a first plurality of bits;

selecting a group of most significant bits from the first plurality of bits of the first index to form a first tag, the first tag comprising a first quantity of bits less than a second quantity of bits in the first plurality of bits;

receiving a second key-value pair for the data group, the second key-value pair comprising a second key and a second value;

generating a second hashed key of the second key using the hash function;

using the second hashed key and the quantity of the first plurality of buckets, generating a second index comprising a second plurality of bits;

generating a second tag using the second index;

determining that the second index is equal to the first index;

based on determining that the second index is equal to the first index, storing the second value in the second array along with the second tag at a second address different from a first address of the first value;

storing a third key-value pair, that results in a third index equal to the first index, in the second array along with a third tag; and forming a linked list in the second array that includes the second value.

2. The method of claim 1, wherein generating the first index comprises performing a modulo operation with a value of the first hashed key as a numerator and the quantity of the first plurality of buckets as a denominator.

3. The method of claim 1, wherein the quantity of the first plurality of buckets is a multiple of 2, and selecting the group of most significant bits from the first plurality of bits to form the first tag comprises:

computing a log to a base 2 value of the quantity of the first plurality of buckets;

subtracting the computed value from a maximum number of bits that a processor of a computer is capable of processing in one computing cycle to produce a first integer; and using a value of the first integer as a number of elements in the group of the most significant bits.

4. The method of claim 3, wherein the maximum number of bits that the processor of the computer is capable of processing in one computing cycle is 64, wherein the quantity of the first plurality of buckets is m, and the number of bits in the group of most significant bits is equal to $64-\log_2 m$.

5. The method of claim 1, wherein the method further comprises:

storing the first tag in a first bucket of the first plurality of buckets; and storing the first value in the first bucket of the first plurality of buckets.

6. The method of claim 3, wherein the method further comprises:

providing a pointer from the first array to the second array, the pointer comprising a number of bits equal to the maximum number of bits; and storing a number of least significant bits out of the number of bits of the pointer as an effective pointer value, wherein the number of the least significant bits is equal to the computed value.

7. The method of claim 1, wherein a ratio of occupied buckets to a total number of buckets in the second array is designated as a load factor, and wherein the first array and the second array resize when the load factor reaches a threshold value.

8. The method of claim 7, wherein the first array and the second array resize together.

9. The method of claim 1, wherein a quantity of the first plurality of buckets is equal to a quantity of the second plurality of buckets.

10. A system comprising:

a processor; and a memory having stored thereon computer-readable instructions, that when executed by the processor cause the processor to:

receive a first key-value pair for a data group, the first key-value pair comprising a first key and a first value, the data group comprising a first array comprising a first plurality of buckets and a second array comprising a second plurality of buckets;

generate a first hashed key of the first key using a hash function;

using the first hashed key and a quantity of the first plurality of buckets, generate a first index comprising a first plurality of bits;

select a group of most significant bits from the first plurality of bits to form a first tag, the first index comprising a first quantity of bits less than a second quantity of bits in the first plurality of bits;

receive a second key-value pair for the data group, the second key-value pair comprising a second key and a second value;

generate a second hashed key of the second key using the hash function;

using the second hashed key and the quantity of the first plurality of buckets, generate a second index comprising a second plurality of bits;

generate a second tag using the second index;

determine that the second index is equal to the first index;

based on determining that the second index is equal to the first index, store the second value in the second array along with the second tag at a second address different from a first address of the first value;

store a third key-value pair, that results in a third index equal to the first index, in the second array along with a third tag; and form a linked list in the second array that includes the second value.

11. The system of claim 10, wherein generating the first index comprises performing a modulo operation with a value of the first hashed key as a numerator and the quantity of the first plurality of buckets as a denominator.

12. The system of claim 10, wherein the quantity of the first plurality of buckets is a multiple of 2, and selecting the group of most significant bits from the first plurality of bits to form the first tag comprises:

computing a log to a base 2 value of the quantity of the first plurality of buckets;

subtracting the computed value from a maximum number of bits that the processor is capable of processing in one computing cycle to produce a first integer; and using a value of the first integer as a number of elements in the group of the most significant bits.

13. The system of claim 12, wherein the maximum number of bits that the processor is capable of processing in one computing cycle is 64, wherein the quantity of the first plurality of buckets is m, and the number of bits in the group of most significant bits is equal to $64-\log_2 m$.

14. The system of claim 10, where the computer-readable instructions further cause the processor to:

store the first tag in a first bucket of the first plurality of buckets; and store the first value in the first bucket of the first plurality of buckets.

15. The system of claim 12, where the computer-readable instructions further cause the processor to:

provide a pointer from the first array to the second array, the pointer comprising a number of bits equal to the maximum number of bit; and store a number of least significant bits out of the number of bits of the pointer as an effective pointer value, wherein the number of the least significant bits is equal to the computed value.

16. The system of claim 10, wherein a quantity of the first plurality of buckets is equal to a quantity of the second plurality of buckets.

17. A computer-readable storage medium having stored thereon computer-readable instructions, that when executed by a processor cause the processor to:

receive a first key-value pair for a data group, the first key-value pair comprising a first key and a first value, the data group comprising a first array comprising a first plurality of buckets and a second array comprising a second plurality of buckets;

generate a first hashed key of the first key using a hash function;

using the first hashed key and a quantity of the first plurality of buckets, generate a first index comprising a first plurality of bits;

select a group of most significant bits from the first plurality of bits of the first index to form a first tag, the first tag comprising a first quantity of bits less than a second quantity of bits in the first plurality of bits;

receive a second key-value pair for the data group, the second key-value pair comprising a second key and a second value;

generate a second hashed key of the second key using the hash function;

using the second hashed key and the quantity of the first plurality of buckets, generate a second index comprising a second plurality of bits;

generate a second tag using the second index;

determine that the second index is equal to the first index;

based on determining that the second index is equal to the first index, store the second value in the second array along with the second tag at a second address different from a first address of the first value;

store a third key-value pair, that results in a third index equal to the first index, in the second array along with a third tag; and form a linked list in the second array that includes the second value.

18. The computer-readable storage medium of claim 17, wherein generating the first index comprises performing a modulo operation with a value of the first hashed key as a numerator and the quantity of the first plurality of buckets as a denominator.

19. The computer-readable storage medium of claim 17, wherein the quantity of the first plurality of buckets is a multiple of 2, and selecting the group of most significant bits from the first plurality of bits to form the first tag comprises:

computing a log to a base 2 value of the quantity of the first plurality of buckets;

subtracting the computed value from a maximum number of bits that the processor is capable of processing in one computing cycle to produce a first integer; and using a value of the first integer as a number of elements in the group of the most significant bits.

20. The computer-readable storage medium of claim 19, wherein the maximum number of bits that the processor is capable of processing in one computing cycle is 64, wherein the quantity of the first plurality of buckets is m, and the number of bits in the group of most significant bits is equal to $64-\log_2 m$.

* * * * *